(12) United States Patent
Zhang et al.

(10) Patent No.: US 8,737,761 B2
(45) Date of Patent: May 27, 2014

(54) METHOD FOR RESTORING AND ENHANCING SPACE BASED IMAGE OF POINT OR SPOT OBJECTS

(71) Applicant: Huazhong University of Science and Technology, Wuhan (CN)

(72) Inventors: Tianxu Zhang, Wuhan (CN); Daolong Wu, Wuhan (CN); Jianchong Chen, Wuhan (CN); Jing Guan, Wuhan (CN); Zheng Yu, Wuhan (CN); Hao Chen, Wuhan (CN); Zhiyong Zuo, Wuhan (CN); Putao Zhang, Wuhan (CN)

(73) Assignee: Huazhong University of Science and Technology, Wuhan (CN)

( * ) Notice: Subject to any disclaimer, the term of this patent is extended or adjusted under 35 U.S.C. 154(b) by 18 days.

(21) Appl. No.: 13/731,100

(22) Filed: Dec. 30, 2012

(65) Prior Publication Data

US 2013/0121609 A1    May 16, 2013

Related U.S. Application Data

(63) Continuation-in-part of application No. PCT/CN2011/078380, filed on Aug. 12, 2011.

(30) Foreign Application Priority Data

Sep. 19, 2010 (CN) .......................... 2010 1 0285526

(51) Int. Cl.
*G06K 9/40* (2006.01)

(52) U.S. Cl.
USPC .................. 382/264; 250/201.9; 250/208.1; 348/241; 355/29; 382/255

(58) Field of Classification Search
CPC ........................................................ G06T 5/00
See application file for complete search history.

(56) References Cited

U.S. PATENT DOCUMENTS

| | | | | |
|---|---|---|---|---|
| 5,412,200 A | * | 5/1995 | Rhoads | 250/201.9 |
| 5,448,053 A | * | 9/1995 | Rhoads | 250/201.9 |
| 6,154,574 A | * | 11/2000 | Paik et al. | 382/255 |
| 6,344,640 B1 | * | 2/2002 | Rhoads | 250/201.9 |
| 6,429,415 B1 | * | 8/2002 | Rhoads | 250/208.1 |
| 7,190,395 B2 | * | 3/2007 | Nakano et al. | 348/241 |
| 2002/0079425 A1 | * | 6/2002 | Rhoads | 250/201.9 |
| 2009/0086174 A1 | * | 4/2009 | Fukumoto et al. | 355/29 |

* cited by examiner

*Primary Examiner* — Tsung-Yin Tsai
(74) *Attorney, Agent, or Firm* — Matthias Scholl P.C.; Matthias Scholl

(57) ABSTRACT

A method for restoring and enhancing a space based image of point or spot objects. The method includes: 1) dividing a space-variable degraded image into multiple space-invariant image sub-blocks, and constructing a point spread function for each of the image sub-blocks; 2) correcting each of the image sub-blocks via a space-invariant image correction method whereby obtaining a corrected image $\hat{f}_i$ for each of the image sub-blocks; and 3) stitching the corrected image sub-blocks $\hat{f}_i$ altogether via a stitching algorithm whereby obtaining a complete corrected image $\hat{f}$.

3 Claims, 34 Drawing Sheets

METHOD FOR RESTORING AND ENHANCING SPACE BASED IMAGE OF POINT OR SPOT OBJECTS

CROSS-REFERENCE TO RELATED APPLICATIONS

This application is a continuation-in-part of International Patent Application No. PCT/CN2011/078380 with an international filing date of Aug. 12, 2011, designating the United States, now pending, and further claims priority benefits to Chinese Patent Application No. 201010285526.0 filed Sep. 19, 2010. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to a cross technology field combining the aerospace technology with image processing, and more particularly to a method for restoring and enhancing a space based image of point or spot objects in large field of view.

2. Description of the Related Art

During space-based observation to the earth by the imaging detection devices, due to limitation of design and manufacturing technology of the imaging detection devices, image quality is to be reduced, and image distortion or blur is to occur. Particularly, signals of point or spot objects are to be weakened as far as spot or point objects are concerned, and thus resulting in missing of the point sources or the porphyritic objects. Blur caused by the imaging sensor itself can be approximately represented by a point spread function model. However, traditional imaging sensors in a small field of view using a space-invariant point spread function degraded model cannot accurately reflects imaging distortion generated by imaging sensors with a large field of view. More importantly, with time passing by, distortion of the imaging system is to increase after the system is built up, and therefore how to develop a digital processing method capable of self-adaptively correcting distortion and blur and improving performance of imaging sensors becomes an important research project, and is also a weak, pending and difficult problem at present.

Imaging distortion caused by the imaging sensors with a large field of view is represented by a space-variable point spread function, and characterized by variant time and space.

Assuming a point spread function of the distortion of the imaging sensor within certain exposure time is represented by PSF(x, y), which can be obtained by convoluting two point spread functions:

1. as for imaging blur caused by different distance between the photosensitive elements and the axis center of the imaging lens, an equivalent point spread function thereof is $PSF_1(r)$, where r represents the distance between the photosensitive elements and the axis center of the imaging lens or the center of the focal plane. As shown in FIGS. 2a-2e, since the manufacturing technique of the imaging sensor, imaging blur at a center of the focal plane caused by diffraction limit, namely $PSF_1(r)$, is relatively small. The larger the distance from the lens axis center is, the greater distortion of the imaging sensor is, which results in large imaging blur, and thus $PSF_1(r)$ is accordingly large (as shown in FIG. 2b).

2. as shown in FIG. 3a, a point spread function at a photosensitive element S(x, y) is $PSF_1(r)(r=\sqrt{x^2+y^2})$, a point object may complete fall on the photosensitive element, namely a point image with a pixel, or on two to four photosensitive elements (as shown in FIGS. 3b to 3d), here all these photosensitive elements generate response and change one point image into a point image with two to four pixels, which cause a blur effect. Likewise, spot objects larger than a photosensitive element falling on multiple photosensitive elements whereby causes additional blur, as shown in FIG. 3e. In other words, since imaging positions are different, point or spot objects with the same size form random, additional blur images on the discrete photosensitive element array of the focal plane of the imaging lens. The blur resulting from a discrete photosensitive element array of a digital imaging sensor can be represented by a random point spread function $PSF_2(x, y)$, and thus a total point spread function can be represented as:

$$PSF(x,y)=PSF_1(x,y)*PSF_2(x,y)$$

To summarize, it is required to provide a new digital image processing technique capable of improving and correcting the above-mentioned imaging blur problems caused by imaging sensor system itself.

SUMMARY OF THE INVENTION

It is one objective of the invention to provide a method for restoring and enhancing a space based image of point or spot objects in large field of view that raises a space-variable point spread function model, takes a imaging blur effect generated by the discrete photosensitive element array of the imaging focal plane of the imaging sensors, and provides an effective restoration and enhancement method for point or spot objects.

To achieve the above objective, in accordance with one embodiment of the invention, there is provided a method for restoring and enhancing a space based image of point or spot objects in large field of view, the method comprising:

preparation on the ground:

1. dividing a space-variable degraded image into multiple space-invariant sub-blocks, and constructing a point spread function for each of the image sub-blocks, the dividing comprising:

1.1. dividing a gray-scale image on a focal plane into M image sub-blocks, the image sub-block indicated by $f_i$, i representing a serial number of each of the image sub-blocks, i=1, 2, L, M, a region of each of the image sub-blocks approximated as an isoplanatic region, and M determined by a distance between a photosensitive element and the axis center of the lens;

1.2. pre-measuring a point spread function $PSF_{i1}(r)$ of each of the image sub-blocks by an optical device on the ground, and storing the point spread function in a database;

1.3. constructing a point spread function $PSF_{i2}(x, y)$ under a fuzzy random degradation effect in each of the image sub-blocks corresponding to a discrete photosensitive element array in a imaging focal plane; and 1.4. constructing an total point spread function model of each of the image sub-blocks $PSF_i(x, y)=PSF_{i1}(x, y)*PSF_{i2}(x, y)$;

2. on-line processing:

correcting each of the image sub-blocks via the total point spread function model, the correcting comprising:

2.1. correcting each of the image sub-blocks via a maximum likelihood estimation algorithm, $PSF_i(r)$ used as an iterative initial value for point spread function, namely $h_i^0=PSF_i(r)$, $f_i$ used as an iterative initial value for a target image, namely $f_i^0 = f_i$, N representing the number of times of iteration, and iteration being formulated as:

$$f_i^n(x) = f_i^{n-1}(x) \sum_{y \in Y} g_i \frac{h_i^{n-1}(y-x)}{\sum_{z \in X} h_i^{n-1}(y-z) f_i^{n-1}(z)}, (1 \le n \le N) \quad (1)$$

$$h_i^n(x) = h_i^{n-1}(x) \sum_{y \in Y} g_i \frac{f_i^n(y-x)}{\sum_{z \in X} h_i^{n-1}(z) f_i^n(y-z)}, (1 \le n \le N) \quad (2)$$

where X represents a support region for the target image, Y represents a support region for an observed image, z∈X, x∈Y, y∈Y, $f_i^n(x)$ represents a corrected image after n times of iteration, $h_i^n(x)$ represents a point spread function after n times of iteration, $g_i$ represents an observed image, namely $f_i$; and 2.2. obtaining a corrected image $\hat{f}_i$ of each of the image sub-blocks, namely $\hat{f}_i = f_i^N(x)$, and a total point spread function $\hat{h}_i = h_i^N(x)$, after the iteration number N is reached;

3. stitching the corrected image sub-blocks $\hat{f}_i$ altogether via a stitching algorithm whereby obtaining a complete corrected image $\hat{f}$.

The invention analyzes origin of a space-variable point spread function of an imaging sensor with a large field of view, and provides A method for restoring and enhancing a space based image of point source or a spot object in large view field capable of effectively restoring and enhancing degraded point or spot objects in the image (as shown in FIGS. 8a-8b).

BRIEF DESCRIPTION OF THE DRAWINGS

FIG. 2a illustrates a distance between the photosensitive and the center of the lens axis or the focal plane, FIG. 2b illustrates a standard deviation of a point spread function $PSF_1(r)$ equivalent to image blur caused by the, blur effect on a region indicated by A in FIG. 2c is the minimum, and therefore a support region of the point spread function is the minimum, with increase of the distance from the center, blur effect becomes even bigger, and thus support regions of point spread functions in regions indicated by B, C, D, E and F increase, and point spread functions with the same indicator are different, FIG. 2d illustrates PSF and the standard deviation σ at a central region is small, PSF and σ surrounding the region are big. FIG. 2e illustrates simulation results of some point spread functions $PSF_1(r)$ caused by the photosensitive comparatively far away from the center of the lens axis;

FIG. 3b illustrates a point object falling on one photosensitive element, FIG. 3c illustrates a point object falling on two photosensitive elements, FIG. 3d illustrates a point object falling on four photosensitive elements.

FIG. 6a is a three-dimensional view of a point object 3 in FIG. 5a;

FIG. 6b is a three-dimensional view of a point object 4 in FIG. 5a;

DETAILED DESCRIPTION OF THE EMBODIMENTS

Figure 1A:
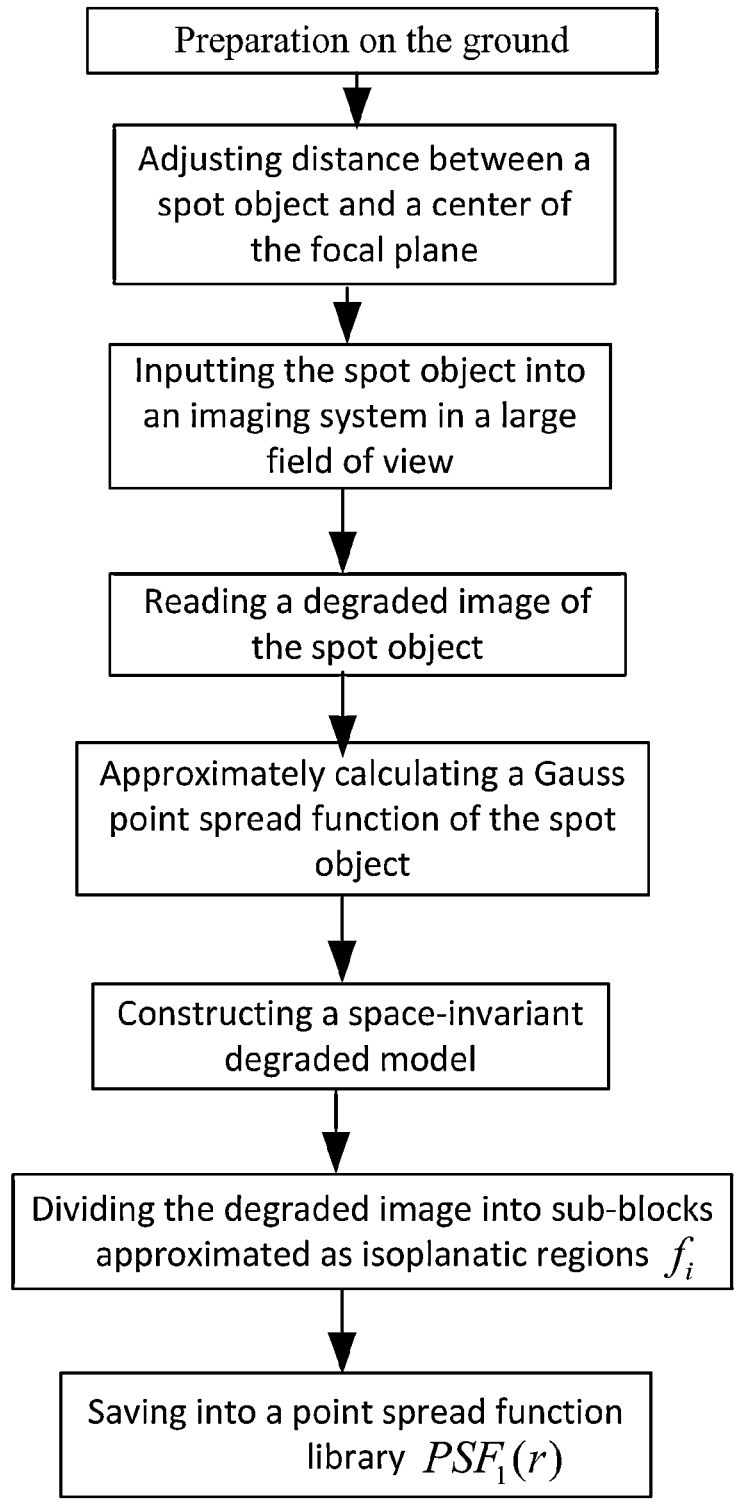
FIGS. 1a-1b are a flowchart of A method for restoring and enhancing a space based image of point or a spot objects in large field of view in accordance with one embodiment of the invention.
Figure 1B:
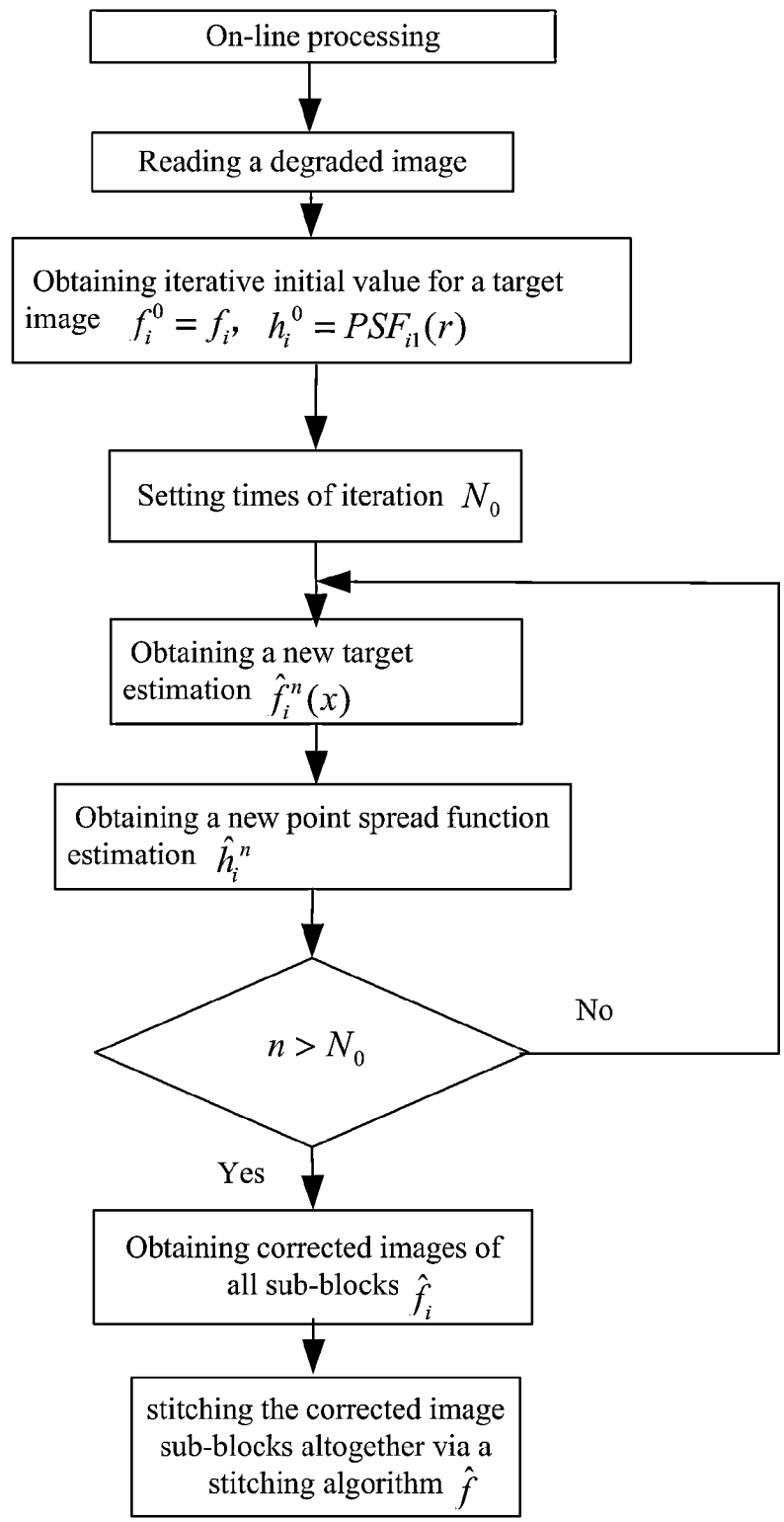
Figure 2A:
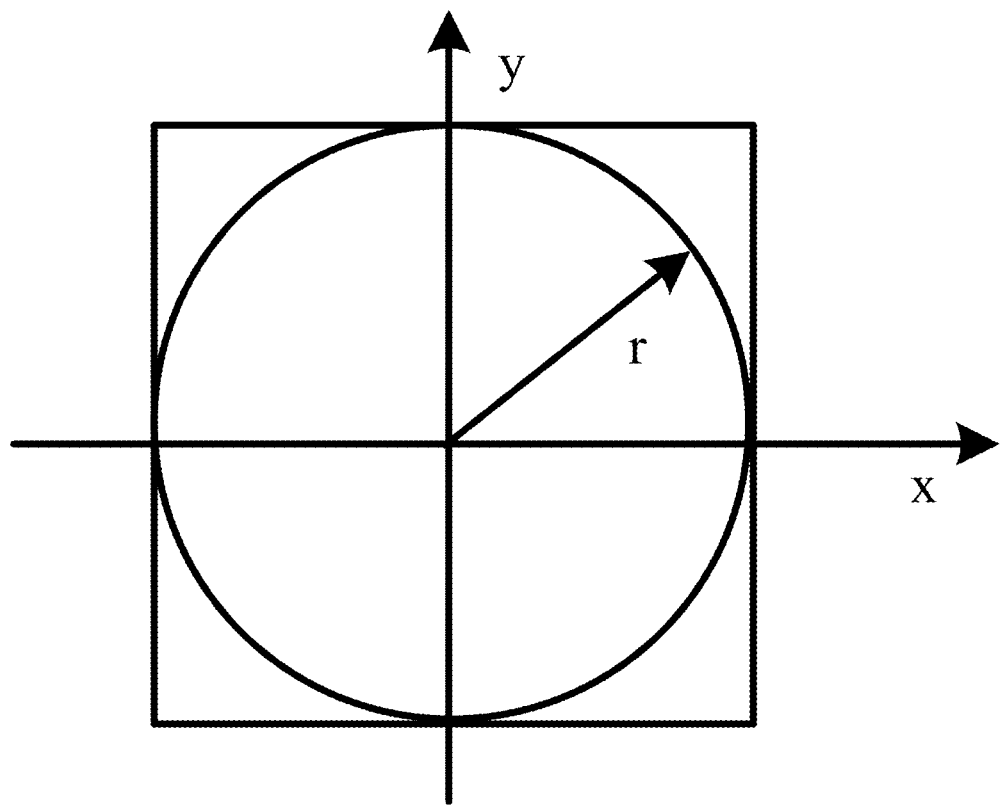
FIGS. 2a-2e illustrate a space-variable spread function analog model caused by an optical lens of an imaging sensor.
Figure 2B:
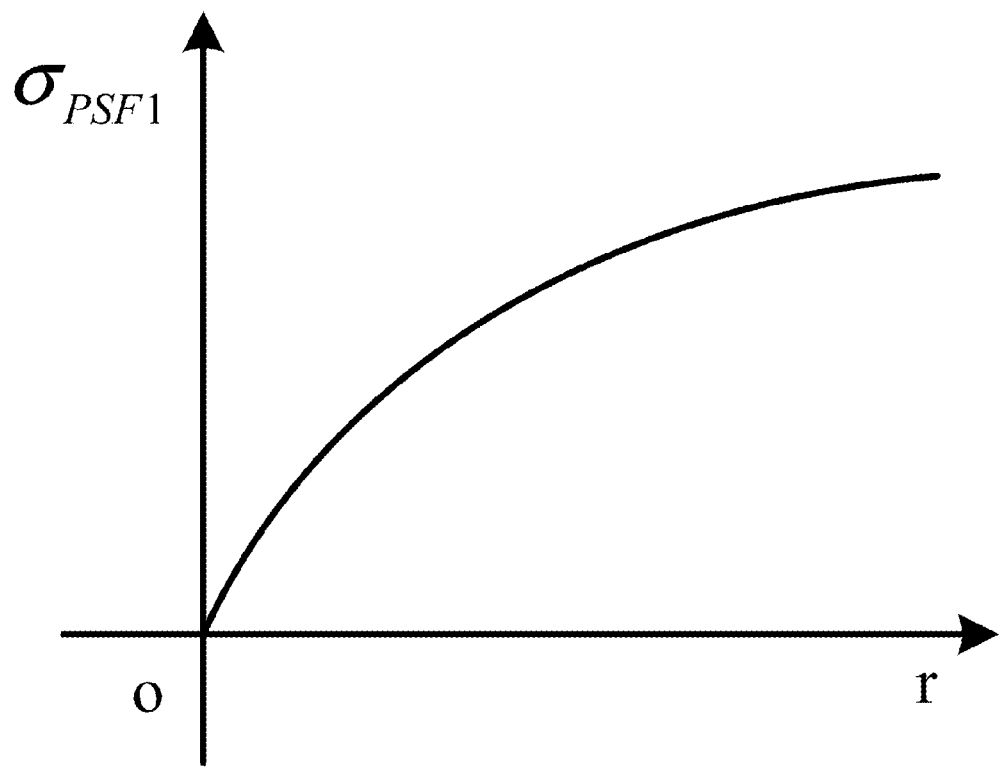
Figure 2C:
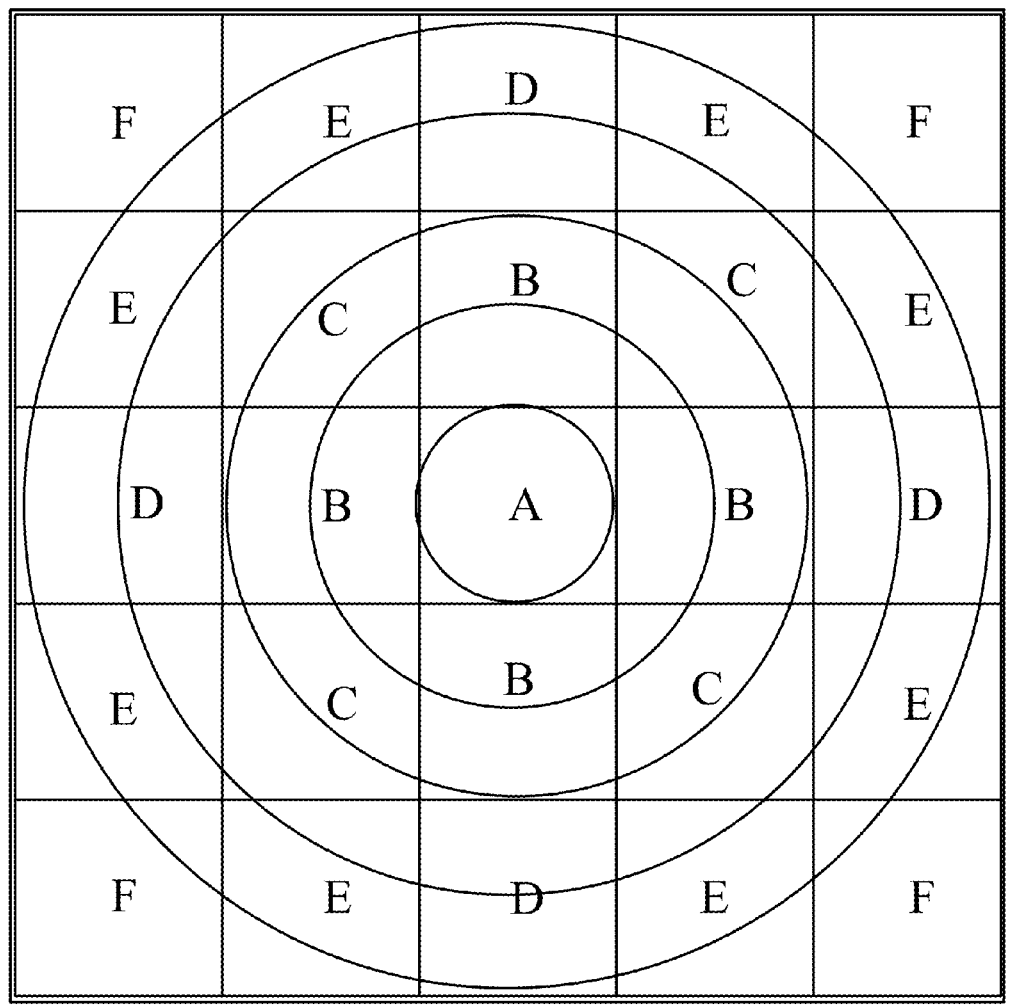
Figure 2D:
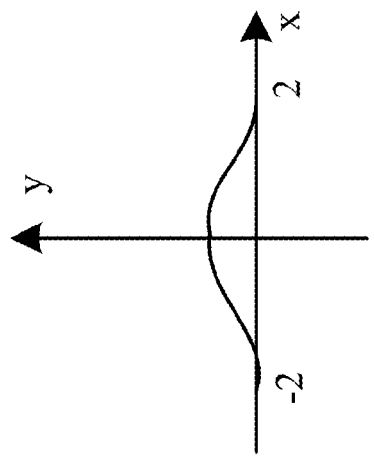
Figure 2D:
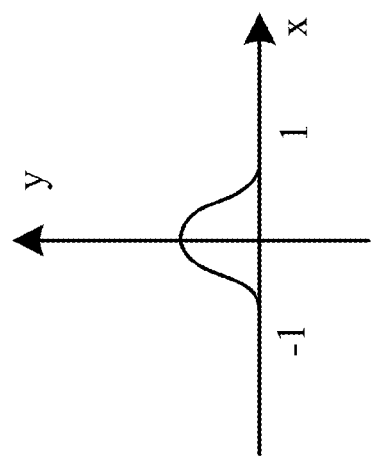
Figure 2D:
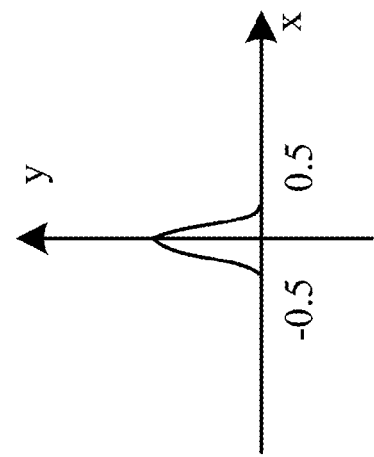
Figure 2E:
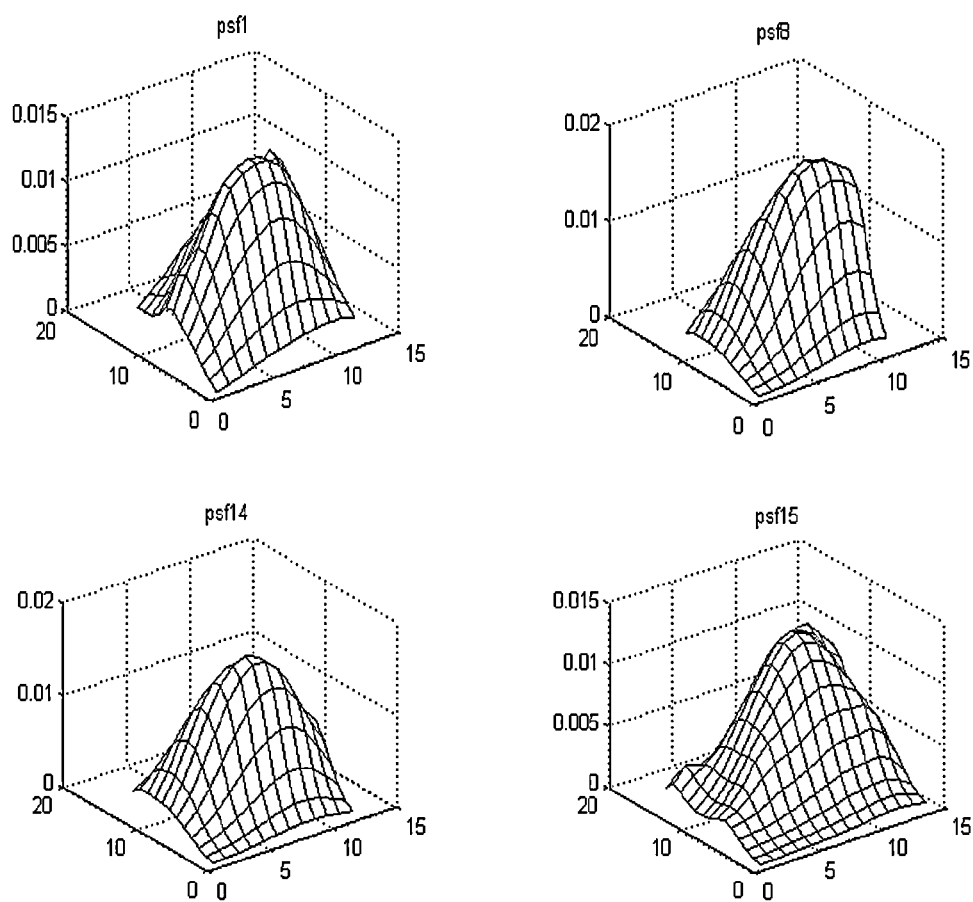
Figure 3A:
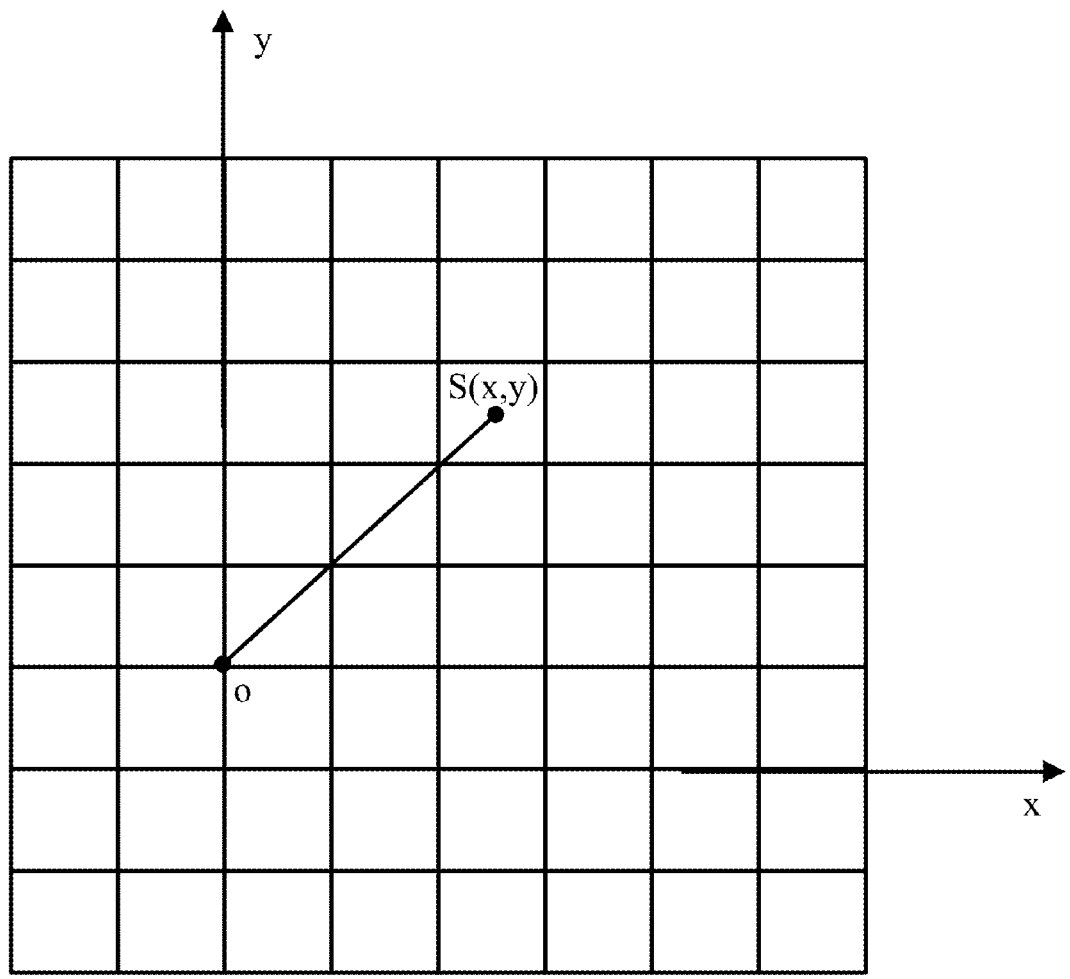
FIG. 3a illustrates a discrete photosensitive element array of a digital imaging sensor.
Figure 3B:
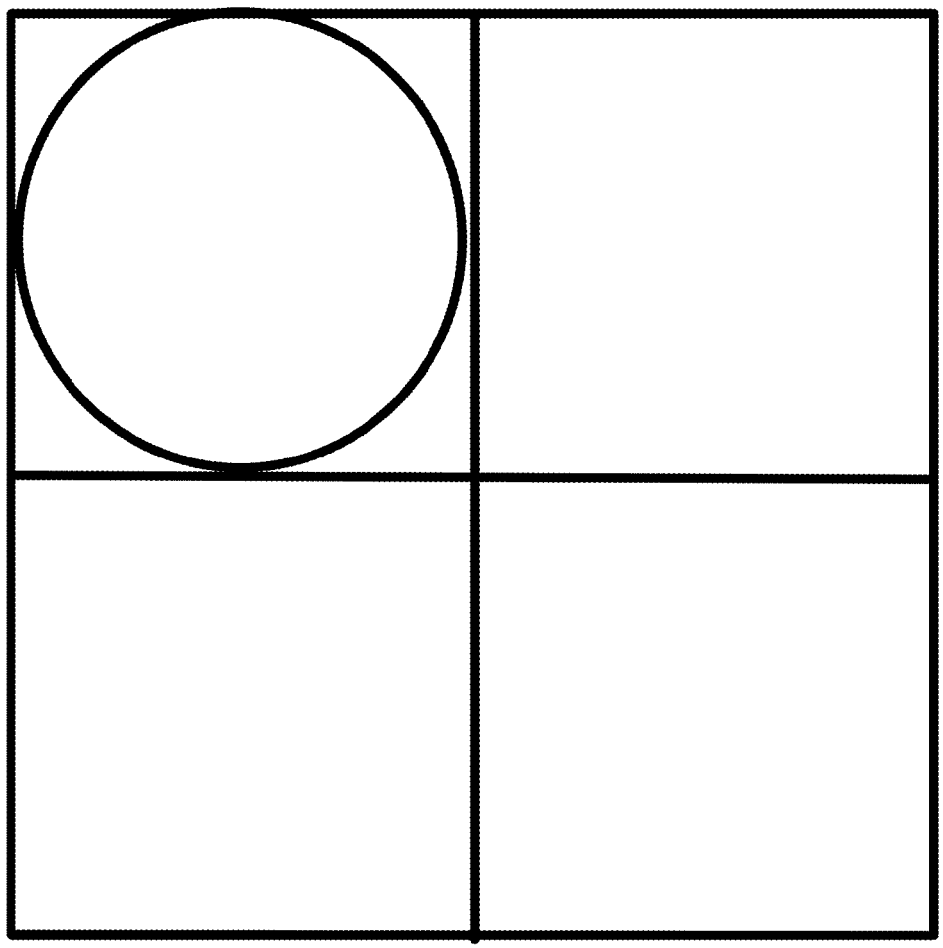
FIGS. 3b to 3d illustrate a point object falling on a discrete photosensitive element of an imaging focal plane, in which a square grid illustrates a photosensitive element, a bold circle illustrates a point or spot object.
Figure 3C:
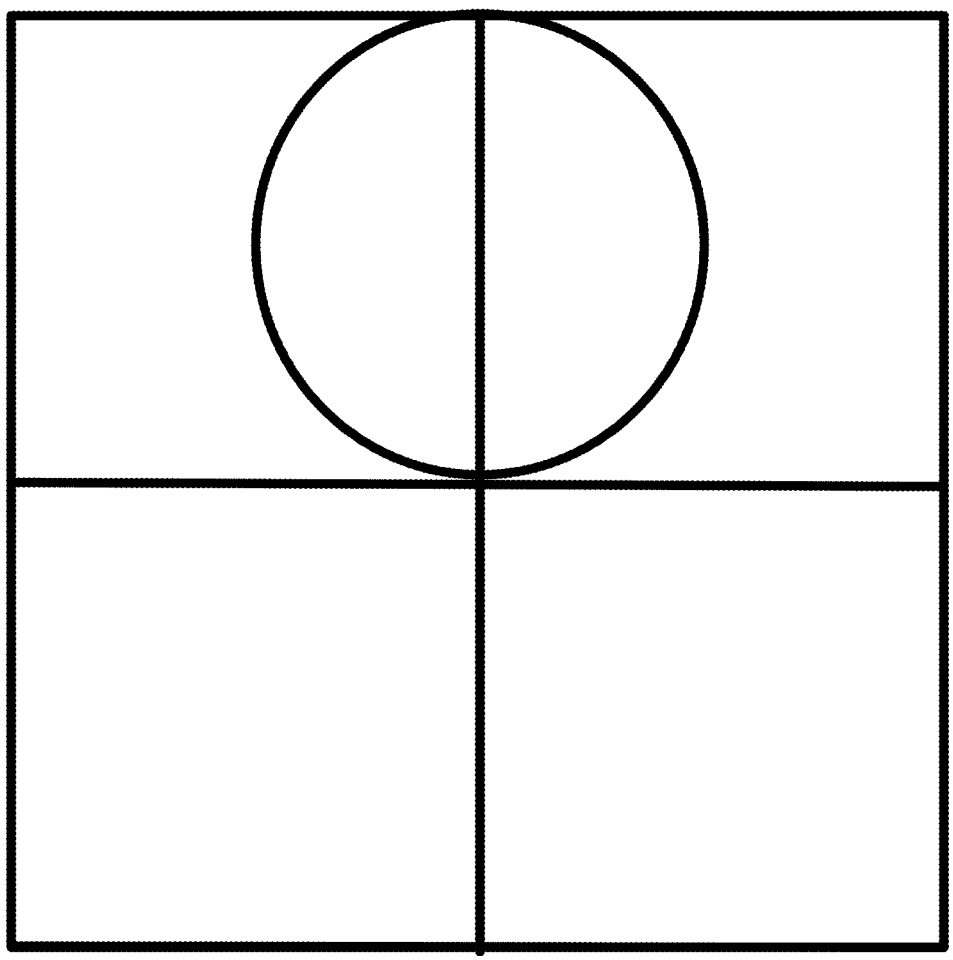
Figure 3D:
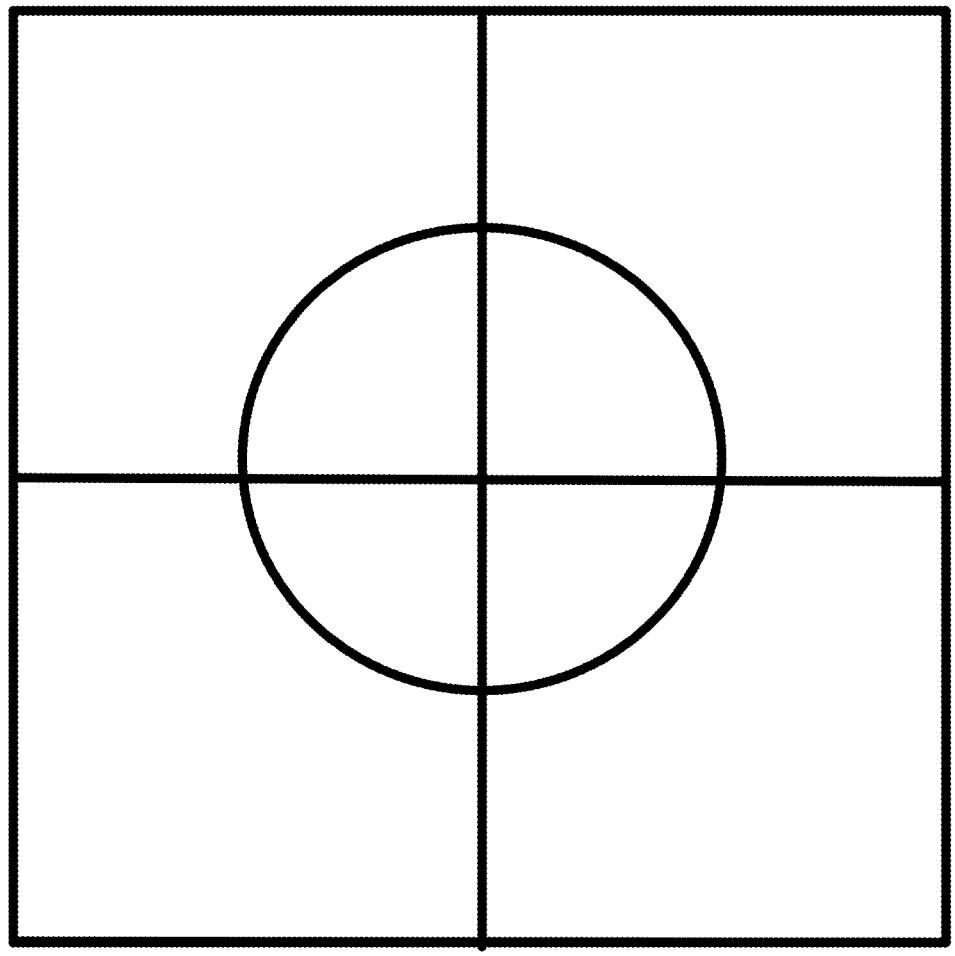
Figure 3E:
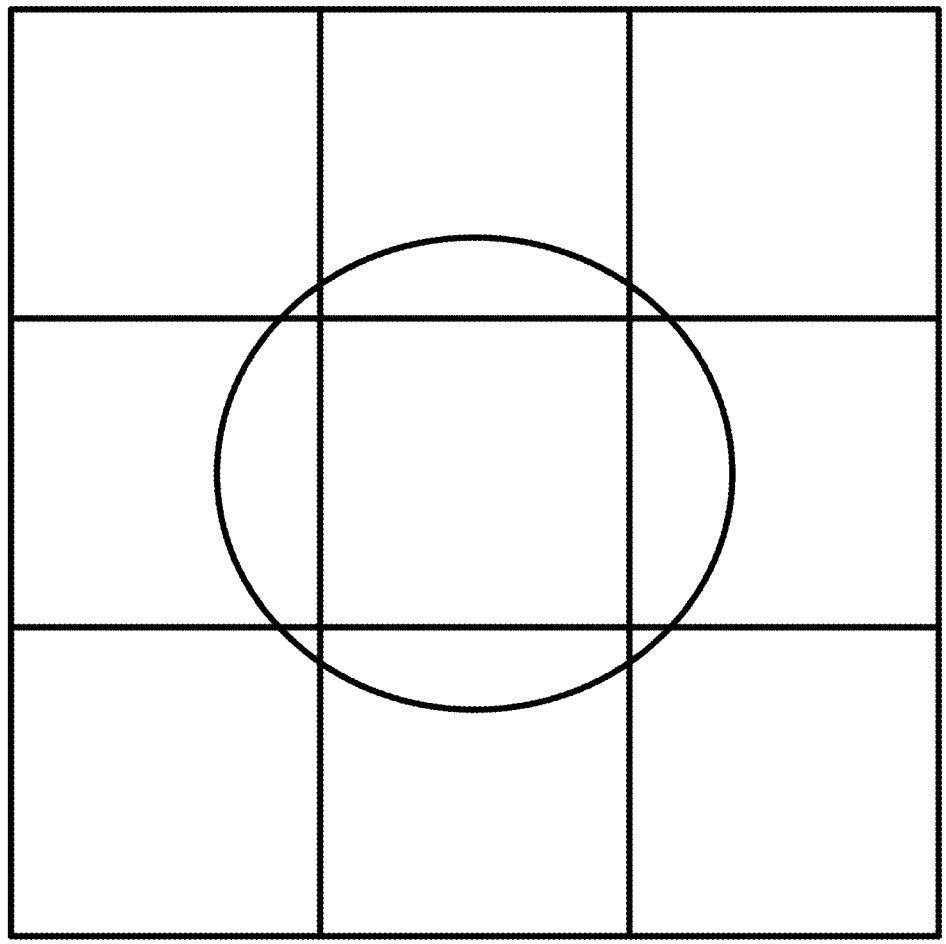
FIG. 3e illustrates a spot object falling on nine photosensitive elements.
Figure 4A:
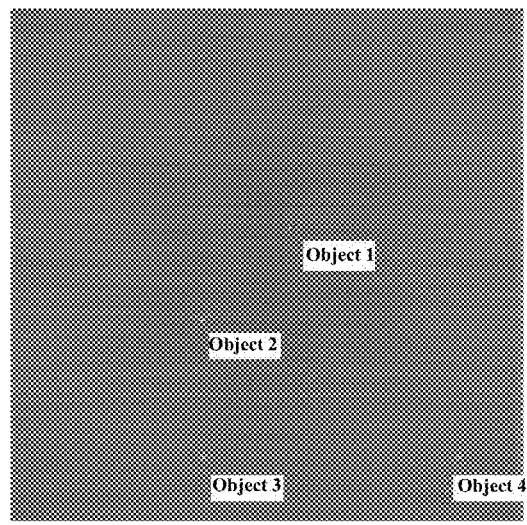
FIG. 4a illustrates a simulated image of a point object falling on discrete photosensitive elements of an imaging focal plane, in which object 1 is a scenario of falling on one photosensitive element, object 2 is a scenario of falling on two photosensitive elements, objects 3 and 4 are scenarios of falling on four photosensitive elements, once the point image becomes bigger, blur occurs.
Figure 4B:
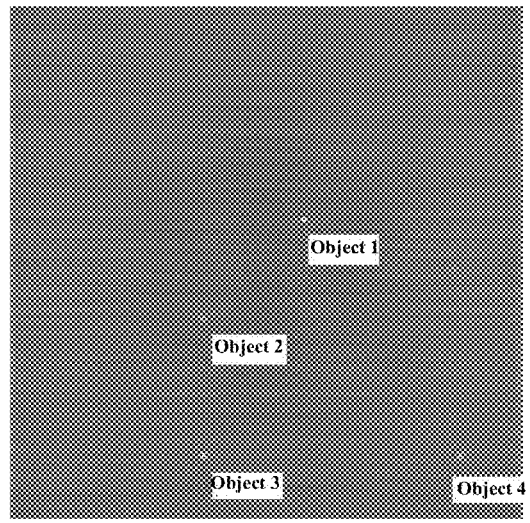
FIG. 4b illustrates a simulated image of four spot objects falling on nine photosensitive elements from different image plane.
Figure 5A:
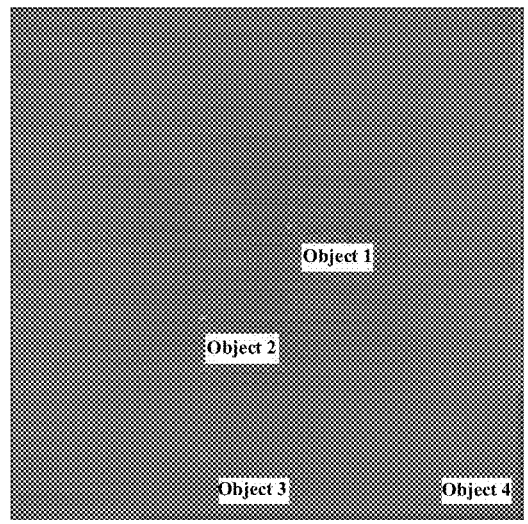
FIG. 5a illustrates a space-variable degraded simulated image of point objects falling on discrete photosensitive elements of an imaging focal plane (FIG. 4a), caused by the distortion of an optical lens of an imaging sensor.
Figure 5B:
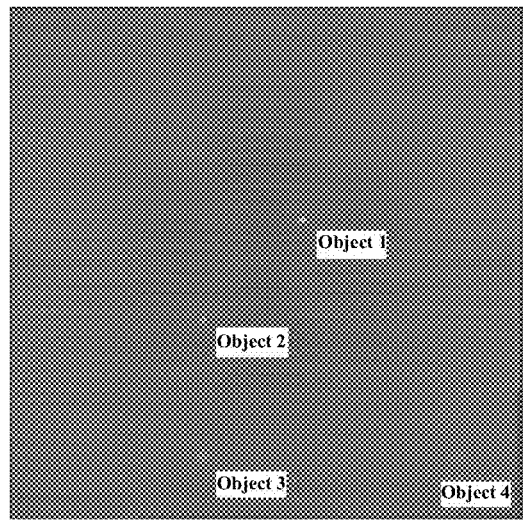
FIG. 5b illustrates a space-variable degraded simulated image of spot objects falling on nine photosensitive elements (FIG. 4b), caused by the distortion of the optical lens of an imaging sensor, as a result, the image of the point or spot objects becomes blur.
Figure 6A:
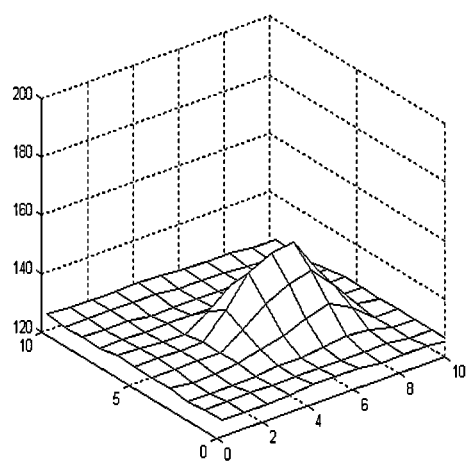
Figure 6B:
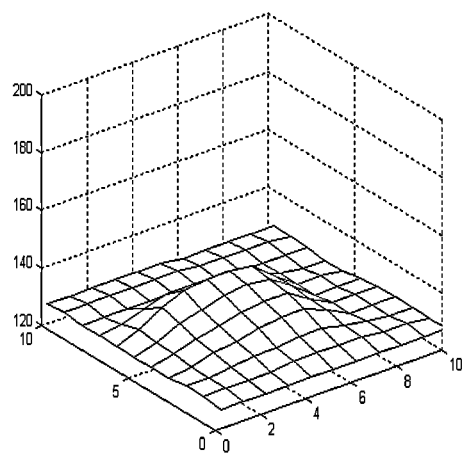
Figure 7A:
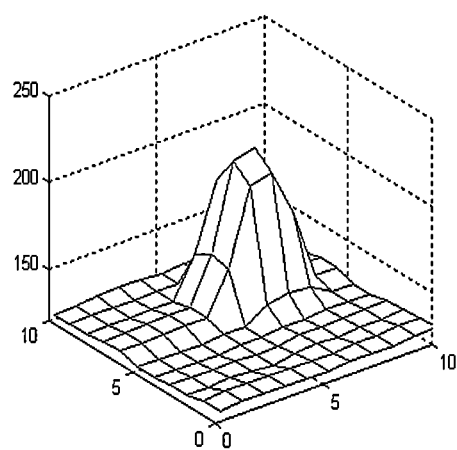
FIG. 7a is a three-dimensional view of a spot object 1 (falling on nine photosensitive elements and thus space-variable degradation caused by distortion of the optical lens of an imaging sensor) in FIG. 5b.
Figure 7B:
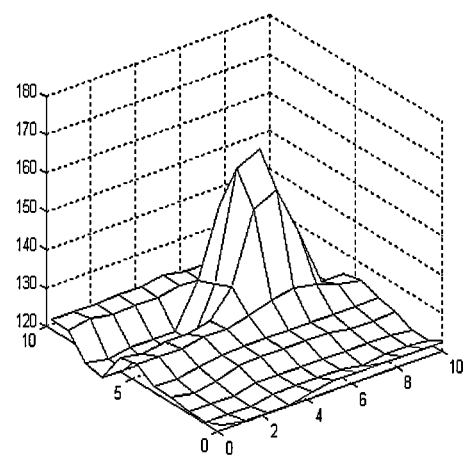
FIG. 7b is a three-dimensional view of a spot object 2 (falling on nine photosensitive elements and thus space-variable degradation caused by distortion of the optical lens of an imaging sensor) in FIG. 5b.
Figure 7C:
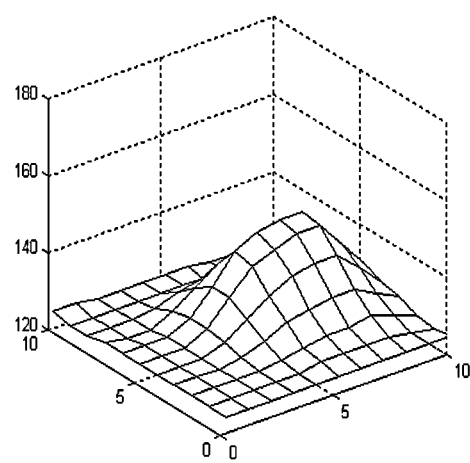
FIG. 7c is a three-dimensional view of a spot object 3 (falling on nine photosensitive elements and thus space-variable degradation caused by distortion of the optical lens of an imaging sensor) in FIG. 5b.
Figure 7D:
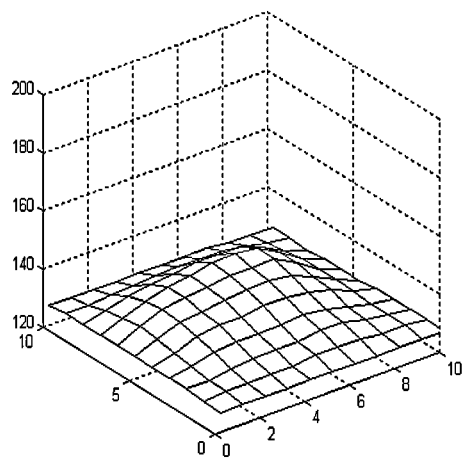
FIG. 7d is a three-dimensional view of a spot object 4 (falling on nine photosensitive elements and thus space-variable degradation caused by distortion of the optical lens of an imaging sensor) in FIG. 5b.
Figure 8A:
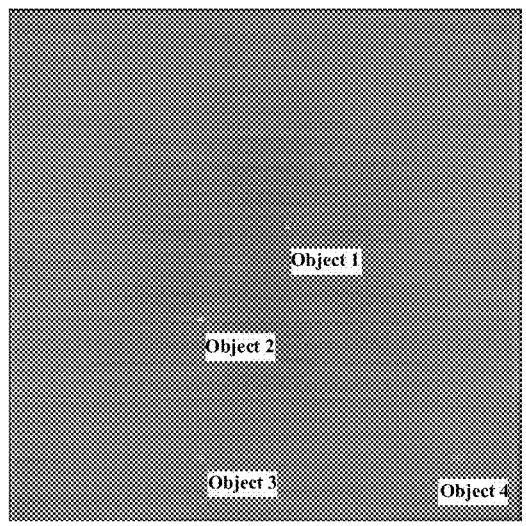
FIG. 8a is a corrected image of FIG. 5a obtained by a traditional space-invariant correction algorithm.
Figure 8B:
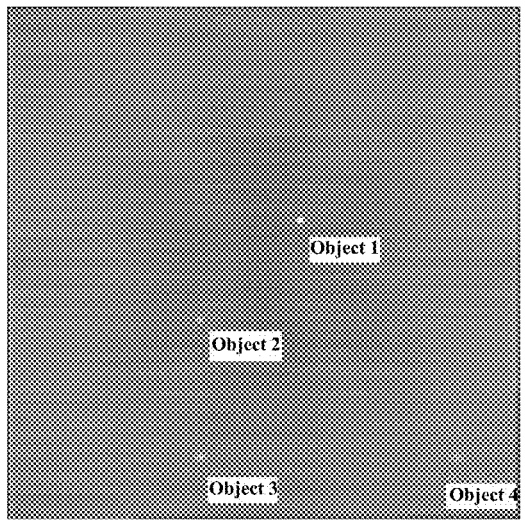
FIG. 8b is a corrected image of FIG. 5b obtained by a traditional space-invariant correction algorithm, and correction effect thereof is poor.
Figure 9A:
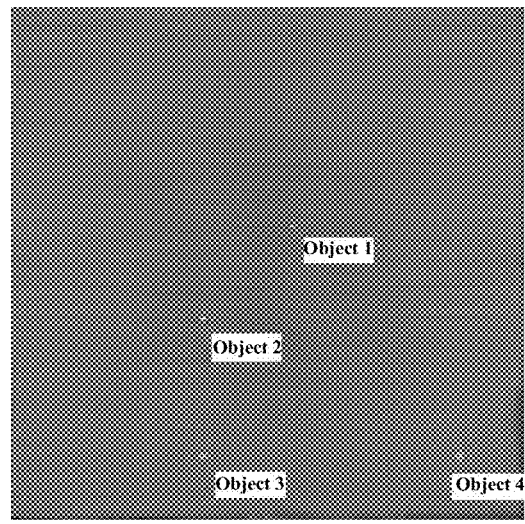
FIG. 9a is a corrected image of FIG. 5a obtained by a space-variable correction algorithm.
Figure 9B:
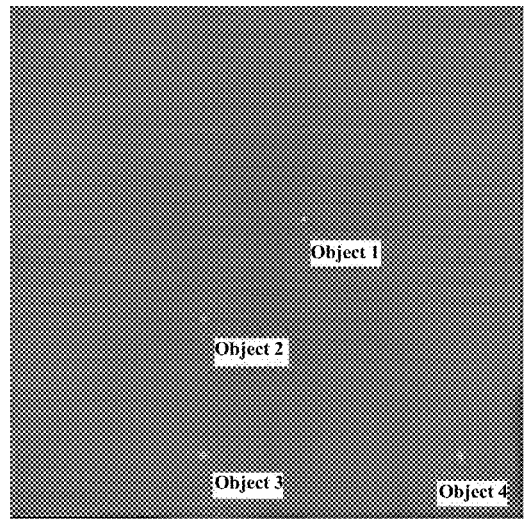
FIG. 9b is a corrected image of FIG. 5b obtained by a space-variable correction algorithm, correction effect thereof is good and energy concentration of objects thereof is comparatively good.

For further illustrating the invention, experiments detailing a method for restoring and enhancing a space based image of point or spot objects in large field of view are described below. It should be noted that the following examples are intended to describe and not to limit the invention.

A method for restoring and enhancing a space based image of point or spot objects in large field of view of the invention comprises:

1. Preparation on the Ground dividing a space-variable degraded image of the point or spot objects, which is caused by limitation of design and manufacturing technology of an imaging sensor, into multiple space-invariant image sub-blocks, and constructing a total point spread function for each of the image sub-blocks, the dividing and constructing comprising:

1) dividing a gray-scale image (namely the space-variable degraded image) on a focal plane into M image sub-blocks according to a distance between a photosensitive element and the center of a lens axis, M is determined by the distance between the photosensitive element and the center of the lens axis, since normally a degraded image with a size ranging from 1×1 to 32×32 is considered to be space-variant, M is equal to a size of an input image divided by 32×32, $f_i$ is used to indicate any one of the image sub-blocks, i is used to represent a serial number of any one of the image sub-blocks, i=1, 2, L, M, a region in each of the image sub-blocks is approximated as an isoplanatic region;

2) pre-measuring a point spread function $PSF_{i1}(r)$ of each of the image sub-blocks by an optical device on the ground, and storing the point spread functions in a database;

3) constructing a point spread function $PSF_{i2}(x, y)$ for each of the image sub-blocks, the $PSF_{i2}(x, y)$ corresponds to a random degradation blurring effect caused by the discrete photosensitive elements array in the imaging focal plane;

4) constructing an total point spread function of each of the image sub-blocks, the function model represented by:

$$PSF_i(x,y) = PSF_{i1}(x,y) * PSF_{i2}(x,y);$$

2. Online Processing:

correcting each of the image sub-blocks via a space-variable degraded point spread function (namely the total point spread function $PSF_i(r)$), the correcting comprising:

(2.1) correcting each of the image sub-blocks via a maximum likelihood estimation algorithm, where $PSF_i(r)$ is used as an iterative initial value for point spread, namely $h_i^0 = PSF_i(r)$, $f_i$ is used as an iterative initial value for a object image, namely $f_i^0 = f_i$, N is used to represent the number of times of iteration, and iteration is formulated as:

$$f_i^n(x) = f_i^{n-1}(x) \sum_{y \in Y} g_i \frac{h_i^{n-1}(y-x)}{\sum_{z \in X} h_i^{n-1}(y-z) f_i^{n-1}(z)}, (1 \le n \le N) \quad (1)$$

$$h_i^n(x) = h_i^{n-1}(x) \sum_{y \in Y} g_i \frac{f_i^n(y-x)}{\sum_{z \in X} h_i^{n-1}(z) f_i^n(y-z)}, (1 \le n \le N) \quad (2)$$

where X represents a support region for the object image, Y represents a support region for an observed image, $z \in X$, $x \in Y$, $y \in Y$, $f_i^n(x)$ represents the $i^{th}$ image sub-block after n times of iteration, $h_i^n(x)$ represents a point spread function of the $i^{th}$ image sub-block after n times of iteration, $g_i$ represents an observed image of the $i^{th}$ image sub-block, namely $f_i$;

(2.2) obtaining a corrected image $\hat{f}_i$ of each of the image sub-blocks, namely $\hat{f}_i = f_i^N(x)$, and a total point spread function $\hat{h}_i = h_i^N(x)$, after the iteration number is reached, namely n=N;

(3) stitching the corrected image sub-blocks $\hat{f}_i$ altogether via a stitching algorithm whereby obtaining a complete corrected image $\hat{f}$.

Figure 10A:
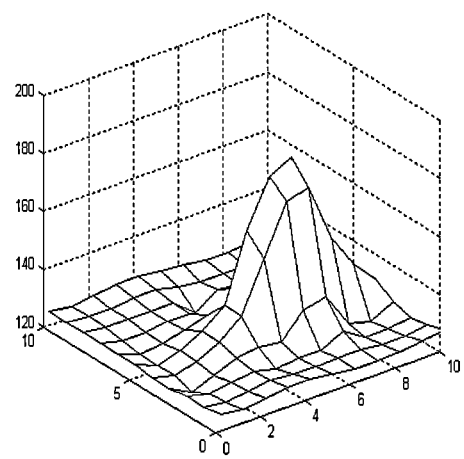
FIG. 10a is a three-dimensional view of the image of the point object 3 in FIG. 9a which corrected by the method for restoring and enhancing a space based image of point or spot objects imaging in large field of view of the invention.
Figure 10B:
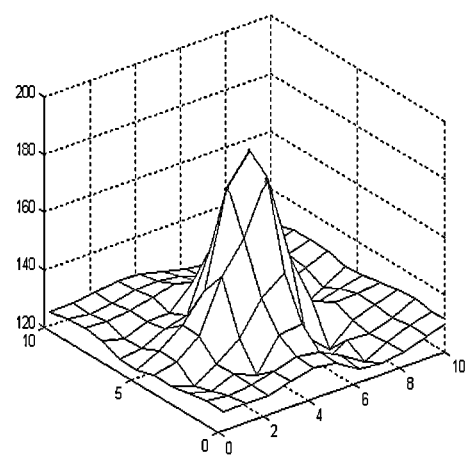
FIG. 10b is a three-dimensional view of the image of the point object 4 in FIG. 9a which corrected by the method for restoring and enhancing a space based image of point or spot objects imaging in large field of view of the invention.
Figure 11A:
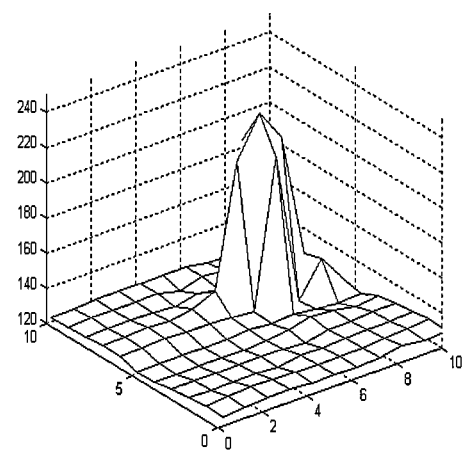
FIG. 11a is a three-dimensional view of the image of the spot object 1 in FIG. 9b which corrected by A method for restoring and enhancing a space based image of point or spot objects imaging in large field of view of the invention.
Figure 11B:
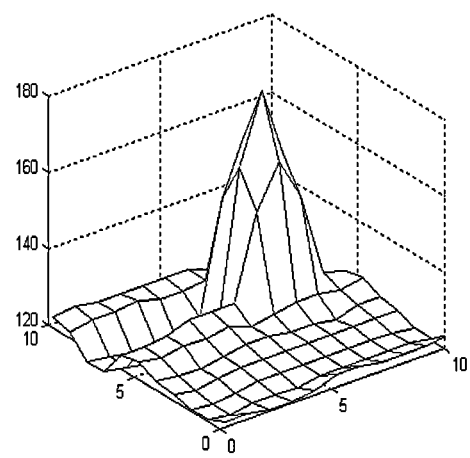
FIG. 11b is a three-dimensional view of the image of the spot object 2 in FIG. 9b which corrected by A method for restoring and enhancing a space based image of point objects imaging in in large field of view of the invention.
Figure 11C:
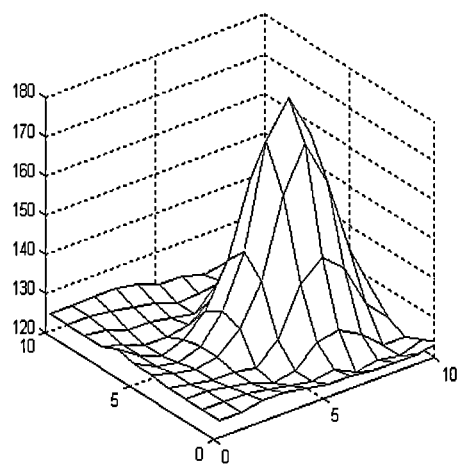
FIG. 11c is a three-dimensional view of the image of the spot object 3 in FIG. 9b which corrected by A method for restoring and enhancing a space based image of point or spot objects imaging in large field of view of the invention.
Figure 11D:
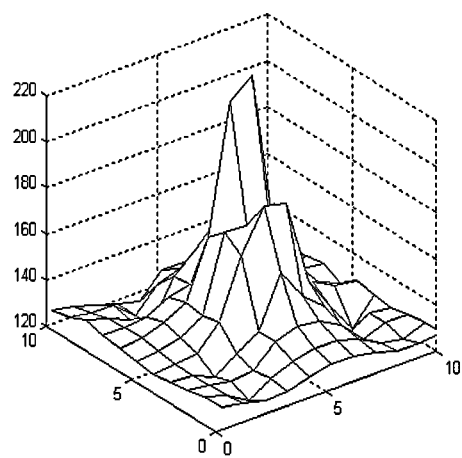
FIG. 11d is a three-dimensional view of the image of the spot object 4 in FIG. 9b which corrected by A method for restoring and enhancing a space based image of point or spot objects imaging in large field of view of the invention.
Figure 12:
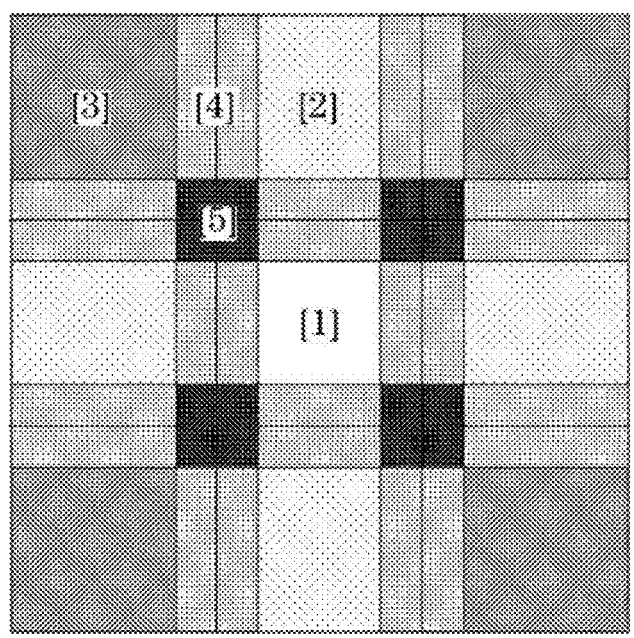
FIG. 12 illustrates a data overlap region obtained by appropriately extending border of an isoplanatic region.
Figure 13:
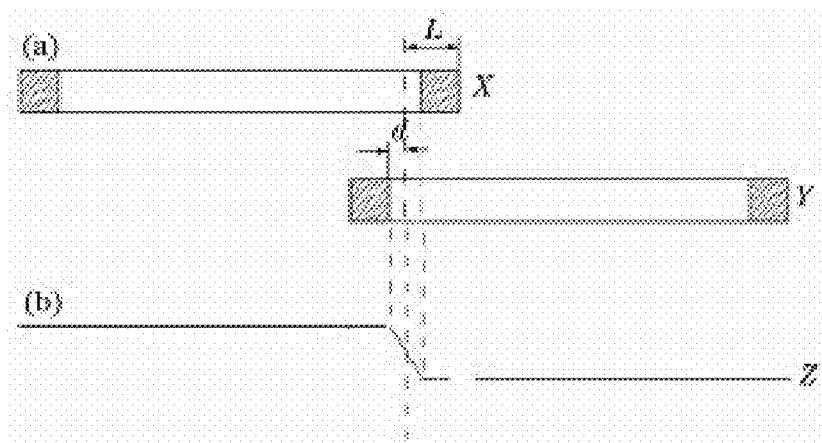
FIG. 13 illustrates a data overlap region in a one-dimensional direction obtained by appropriately extending border of an isoplanatic region.

In details, during the stitching process, border of the isoplanatic region of the image sub-block is appropriately extended, a weighting coefficient is constructed based on the distance between a pixel point in the overlap region and the border, and gradual stitching is facilitated by data in the overlap region whereby eliminating visually split sense of the stitched image. As shown in FIGS. 10a-10b, regions 1, 2 and 3 are the regions not overlapped with other regions in a scale model at certain level, and thus do not need to be further process and original values can be directly used. The region 4 is the overlap portion of two regions, and region 5 is the overlapped portion of four regions.

During the stitching and overlapping process, obvious block effect is to be generated if no further processing is done. If values in the region are simply averaged, the result is not good enough. Therefore, a weighted average method is used, and overlapping in a one-dimension direction is used as an example to illustrate the weighting coefficient thereof. As shown in FIGS. 11a-11d, assuming two adjacent image sub-blocks are represented respectively by X and Y, an image after stitching the image sub-blocks is represented by Z, size of X and Y is respectively represented by M and N, The border of the isoplanatic region is extended by L, namely the border thereof is located at the $(M-L)^{th}$ column of X, and at the $L^{th}$ column of Y. After image correction, a $1^{th}$ column of the overlapping region is eliminated and the width of the remaining overlapping region of the two image sub-blocks is 2d=2(L−1), namely the border of the isoplanatic region is located at the $M-d^{th}$ column of X, and at the $d^{th}$ column of Y. Continued to eliminate the overlapping region with the weighting coefficient is renewed by 50%/d=1/(2d).

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for restoring and enhancing a space based image of point or spot objects, the method comprising:
   (1) dividing a space-variable degraded image into multiple space-invariant image sub-blocks, and constructing a point spread function for each of said image sub-blocks, the dividing and constructing comprising:
      (1.1) dividing a gray-scale image on a focal plane into M image sub-blocks, said image sub-block indicated by $f_i$, i representing a serial number of each of said image sub-blocks, i=1, 2, . . . , M, a region within each of said of said image sub-blocks, i=1, 2, ..., M, a region within each of said image sub-blocks approximated as an isoplanatic region, and M determined by a distance between a photosensitive element and a lens axis;

(1.2) pre-measuring a point spread function $PSF_1(r)$ of each of said image sub-blocks by an optical device on the ground, and storing said point spread function in a database;

(1.3) constructing a point spread function $PSF_2(x, y)$ under a fuzzy random degradation effect in each of said image sub-blocks corresponding to a discrete photosensitive element array in a imaging focal plane; and (1.4) constructing an total function of each of said image sub-blocks:

$$PSF(x,y)=PSF_1(x,y)*PSF_2(x,y)$$

(2) correcting each of said image sub-blocks via a space-invariant image correction method whereby obtaining a corrected image $\hat{f}_i$ for each of said image sub-blocks; and (3) stitching said corrected image sub-blocks $\hat{f}_i$ altogether via a stitching algorithm whereby obtaining a complete corrected image f; wherein a correction processing step (2) comprise:

(2.1) correcting each of said image sub-blocks via a maximum likelihood estimation algorithm, $PSF_1(r)$ being used as an iterative initial value for point spread, namely $h_i^0=PSF_1(r)$, $f_i$ being used as an iterative initial value for a object image, namely $f_i^0=f_i$, N representing iteration number, and iteration being formulated as:

$$f_i^n(x) = f_i^{n-1}(x) \sum_{y \in Y} g_i \frac{h_i^{n-1}(y-x)}{\sum_{z \in X} h_i^{n-1}(y-z) f_i^{n-1}(z)}, (1 \le n \le N) \quad (1)$$

-continued $$h_i^n(x) = h_i^{n-1}(x) \sum_{y \in Y} g_i \frac{f_i^n(y-x)}{\sum_{z \in X} h_i^{n-1}(z) f_i^n(y-z)}, (1 \le n \le N) \quad (2)$$

where X represents a support region for said object image, Y represents a support region for an observed image, z∈X, x∈Y, y∈Y, $f_i^0(x)$ represents a corrected image after n times of iteration, $h_i^0*(x)$ represents a point spread function after n times of iteration, $g_i$ represents an observed image, namely $f_i$; and (2.2) obtaining a corrected image $\hat{f}_i$ of each of said image sub-blocks, namely $\hat{f}_i=f_i^x(x)$, and a total point spread function $\hat{h}_i=h_i^x(x)$, after said iteration number is reached.

2. The method of claim 1, wherein during a stitching process in step (3), border of said isoplanatic region is appropriately extended, a weighting coefficient is constructed based on a distance between a pixel in an overlap region and said border, and gradual stitching is facilitated by using data in said overlap region upon dividing said image into sub-blocks, whereby visually eliminating split sense of said stitched image.

3. The method of claim 1, wherein during a stitching process in step (3), border of said isoplanatic region is appropriately extended, a weighting coefficient is constructed based on a distance between a pixel in an overlap region and said border, and gradual stitching is facilitated by using data in said overlap region upon dividing said image into sub-blocks, whereby visually eliminating split sense of said stitched image.

* * * * *